US009560622B2

United States Patent
Gupta et al.

(10) Patent No.: US 9,560,622 B2
(45) Date of Patent: Jan. 31, 2017

(54) INDOOR POSITIONING IN THE PRESENCE OF DYNAMIC TRANSMISSION POWER CONTROL ACCESS POINTS

(71) Applicant: QUALCOMM Incorporated, San Diego, CA (US)

(72) Inventors: Rajarshi Gupta, Sunnyvale, CA (US); Vinay Sridhara, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/731,264

(22) Filed: Jun. 4, 2015

(65) Prior Publication Data

US 2015/0271778 A1 Sep. 24, 2015

Related U.S. Application Data

(63) Continuation of application No. 13/332,957, filed on Dec. 21, 2011, now Pat. No. 9,081,080.
(Continued)

(51) Int. Cl.
*H04W 64/00* (2009.01)
*G01S 5/00* (2006.01)
(Continued)

(52) U.S. Cl.
CPC ............ *H04W 64/00* (2013.01); *G01S 5/0063* (2013.01); *G01S 5/0252* (2013.01); *H04W 24/02* (2013.01); *H04W 52/28* (2013.01)

(58) Field of Classification Search
CPC ....... H04W 52/28; H04W 24/02; H04W 64/00
(Continued)

(56) References Cited

U.S. PATENT DOCUMENTS 5,893,035 A * 4/1999 Chen .................... H04W 52/40
455/442
7,558,852 B2 7/2009 Douglas et al.
(Continued)

FOREIGN PATENT DOCUMENTS

CN 101697641 A 4/2010
CN 201699986 U 1/2011
(Continued)

OTHER PUBLICATIONS

Bahl, Paramvir and Padmanabhan, Venkata N. [Microsoft Research {bahl, padmanab}@microsoft.com]; Balachandran, Anand [University of California at San Diego anandb@cs.ucsd.edu], Software System for Locating Mobile Users: Design, Evaluation, and Lessons, 2000, http://citeseerx.ist.psu.edu/viewdoc/downloaddoi"10.1.1.43.3784&rep=rep1&type=pdf.
(Continued)

*Primary Examiner* — Sam Bhattacharya
(74) *Attorney, Agent, or Firm* — Berkeley Law & Technology Group, LLP

(57) ABSTRACT

A position fix for a mobile platform is determined using RSSI values for wireless signals received from access points (APs), at least one of which has dynamic transmission power control. The transmission power data for the APs is received from an entity separate from the APs, e.g., a central entity or a positioning assistance server. The RSSI values for wireless signals received from the APs are acquired, as is an RSSI heatmap. Using the transmission power data, the RSSI values and the RSSI heatmap, the position fix for the mobile platform is determined. The position fix may be determined by the mobile platform or a positioning assistance server. Additionally, a server may receive transmission power data for APs and may provide to a mobile platform RSSI heatmap information based on the transmission power data. The RSSI
(Continued)

heatmap information may be, e.g., the transmission power data or a RSSI heatmap.

20 Claims, 4 Drawing Sheets

Related U.S. Application Data

(60) Provisional application No. 61/449,505, filed on Mar. 4, 2011.

(51) Int. Cl.
*G01S 5/02* (2010.01)
*H04W 24/02* (2009.01)
*H04W 52/28* (2009.01)

(58) Field of Classification Search
USPC ......... 455/517, 456.1–456.3, 456.6; 370/252
See application file for complete search history.

(56) References Cited

U.S. PATENT DOCUMENTS

| 7,774,000 | B2 | 8/2010 | Kezys |
| 7,966,021 | B2 | 6/2011 | Dietrich et al. |
| 7,999,742 | B2 | 8/2011 | Alizadeh-Shabdiz |
| 2004/0259575 | A1 | 12/2004 | Perez-Breva et al. |
| 2005/0037776 | A1 | 2/2005 | Perez-Breva et al. |
| 2005/0208952 | A1 | 9/2005 | Dietrich et al. |
| 2009/0005063 | A1 | 1/2009 | Malik et al. |
| 2011/0043407 | A1 | 2/2011 | Moshfeghi |
| 2012/0056786 | A1 | 3/2012 | Pandey et al. |
| 2012/0225663 | A1 | 9/2012 | Gupta et al. |

FOREIGN PATENT DOCUMENTS

| JP | 2002010325 A | 1/2002 |
| JP | 2010500604 A | 1/2010 |
| JP | 2010515363 A | 5/2010 |
| TW | 200847686 A | 12/2008 |
| WO | WO-2008021979 A2 | 2/2008 |
| WO | WO-2008085439 A1 | 7/2008 |

OTHER PUBLICATIONS

International Search Report and Written Opinion—PCT/US2012/020174—ISA/EPO—Apr. 16, 2012 (111199WO).
Taiwan Search Report—TW101101811—TIPO—Apr. 16, 2014 (111199TW).
European Search Report—EP15165644—Search Authority—Munich—Oct. 5, 2010 (111199EPD1).

* cited by examiner

INDOOR POSITIONING IN THE PRESENCE OF DYNAMIC TRANSMISSION POWER CONTROL ACCESS POINTS

CROSS-REFERENCE TO RELATED APPLICATION(S)

This application is a continuation of U.S. application Ser. No. 13/332,957, entitled "RSSI-BASED INDOOR POSITIONING IN THE PRESENCE OF DYNAMIC TRANSMISSION POWER CONTROL ACCESS POINTS," filed Dec. 21, 2011, which claims the benefit of U.S. Provisional Application No. 61/449,505, filed Mar. 4, 2011, and entitled "RSSI-BASED INDOOR POSITIONING IN THE PRESENCE OF DYNAMIC TX POWER CONTROL APS," both of which are assigned to the assignee hereof and are expressly incorporated herein by reference.

BACKGROUND

Background Field

Embodiments of the subject matter described herein relate generally to portable electronic devices, and more particularly, to determining a position fix with portable electronic devices.

Relevant Background

Portable electronic devices, referred to herein as a mobile platforms, conventionally use an indoor positioning engine to determine an indoor position fix. One of the key inputs to an indoor positioning engine is the received signal strength indication (RSSI) measurements from access points (APs). The RSSI measurements made by a mobile platform are evaluated against an RSSI heatmap. An RSSI heatmap is essentially a map of the signal strength for a particular AP based on the distance from the location of the AP. Using RSSI measurements from multiple APs and heatmaps for each AP, the position of the mobile platform may be determined. One particular advantage of RSSI measurements is that they may be carried out by a mobile platform without associating with the APs, which saves time, energy and the need for authentication.

The RSSI values are a measure of the strength of a signal transmitted by an AP. Thus, in order to accurately estimate RSSI values for use with an RSSI heatmap, the transmission power of the AP must be known. Conventionally, measured RSSI values are used with heatmaps assuming that the transmit power is non-varying and is either known a priori or assumed to be a standard transmit power (e.g., 17 dBm or 20 dBm).

Certain APs, however, such as Cisco Lightweight APs, vary the transmission power of an AP (referred to as dynamic transmit power control) based on factors such as the AP load, interference from nearby radio frequency (RF) sources, and other similar factors. Thus, the transmission power for APs using dynamic transmit power control cannot be known a priori or assumed to be any particular value. Accordingly, in an environment with APs having dynamic transmit power control, navigation using RSSI heatmaps is conventionally not possible.

SUMMARY

A position fix for a mobile platform is determined using RSSI values for wireless signals received from access points (APs), at least one of which has dynamic transmission power control. The transmission power data for the APs is received from an entity separate from the APs, e.g., a central entity or a positioning assistance server. The RSSI values for wireless signals received from the APs are acquired, as is an RSSI heatmap. Using the transmission power data, the RSSI values and the RSSI heatmap, the position fix for the mobile platform is determined. The position fix may be determined by the mobile platform or a positioning assistance server. Additionally, a server may receive transmission power data for APs and may provide to a mobile platform RSSI heatmap information based on the transmission power data. The RSSI heatmap information may be, e.g., the transmission power data or a RSSI heatmap that incorporates the transmission power data.

In an embodiment, a method includes receiving transmission power data for at least one of a plurality of access points from an entity separate from the plurality of access points, wherein the at least one of the plurality of access points has dynamic transmission power control; acquiring received signal strength indication (RSSI) values for wireless signals received from the plurality of access points; receiving an RSSI heatmap for the plurality of access points; and using the transmission power data for the at least one of the plurality of access points, the RSSI values and the RSSI heatmap to determine a position fix.

In an embodiment, an apparatus includes an external interface configured to receive signals from an entity separate from a plurality of access points, wherein at least one of the plurality of access points has dynamic transmission power control; and a processor coupled to the external interface, the processor is configured to cause the external interface to receive transmission power data for the at least one of the plurality of access points from the entity, acquire signal strength indication (RSSI) values for wireless signals from the plurality of access points; receive an RSSI heatmap for the plurality of access points, and determine a position fix based on the transmission power data for the at least one of the plurality of access points, the RSSI values and the RSSI heatmap.

In an embodiment, an apparatus includes means for receiving transmission power data for at least one of a plurality of access points from an entity separate from the plurality of access points, wherein the at least one of the plurality of access points has dynamic transmission power control; means for acquiring received signal strength indication (RSSI) values for wireless signals received from the plurality of access points; means for receiving an RSSI heatmap for the plurality of access points; and means for using the transmission power data for the at least one of the plurality of access points, the RSSI values and the RSSI heatmap to determine a position fix.

In an embodiment, a non-transitory computer-readable medium including program code stored thereon includes program code to receive transmission power data for at least one of a plurality of access points from an entity separate from the at least one of the plurality of access points, the at least one of the plurality of access points has dynamic transmission power control; program code to acquire received signal strength indication (RSSI) values for wireless signals received from the plurality of access points; program code to receive an RSSI heatmap for the plurality of access points; and program code to use the transmission power data for the at least one of the plurality of access points, the RSSI values and the RSSI heatmap to determine a position fix.

In an embodiment, a method includes receiving transmission power data for at least one of a plurality of access points from an entity separate from the plurality of access points, wherein the at least one of the plurality of access points has dynamic transmission power control; and providing received signal strength indication (RSSI) heatmap information to a mobile platform, wherein the RSSI heatmap information is based on the transmission power data received for the at least one of the plurality of access points that has dynamic transmission power control and the RSSI heatmap information is configured to be used by the mobile platform along with measured RSSI values to determine a position fix.

In an embodiment, an apparatus includes an external interface configured to receive signals from an entity separate from a plurality of access points and to transmit signals to a mobile platform, wherein at least one of the plurality of access points has dynamic transmission power control; and a processor coupled to the external interface, the processor configured to receive through the external interface transmission power data for the at least one of a plurality of access points from the entity separate from the plurality of access points, and provide through the external interface received signal strength indication (RSSI) heatmap information to the mobile platform, wherein the RSSI heatmap information is based on the transmission power data received for the at least one of the plurality of access points that has dynamic transmission power control and the RSSI heatmap information is configured to be used by the mobile platform along with measured RSSI values to determine a position fix.

In an embodiment, an apparatus includes means for receiving transmission power data for at least one of a plurality of access points from an entity separate from the plurality of access points, wherein the at least one of the plurality of access points has dynamic transmission power control; and means for providing received signal strength indication (RSSI) heatmap information to a mobile platform, wherein the RSSI heatmap information is based on the transmission power data received for the at least one of the plurality of access points that has dynamic transmission power control and the RSSI heatmap information is configured to be used by the mobile platform along with measured RSSI values to determine a position fix.

In an embodiment, a non-transitory computer-readable medium including program code stored thereon includes program code to receive transmission power data for at least one of a plurality of access points from an entity separate from the plurality of access points, wherein the at least one of the plurality of access points has dynamic transmission power control; and program code to provide received signal strength indication (RSSI) heatmap information to a mobile platform, wherein the RSSI heatmap information is based on the transmission power data received for the at least one of the plurality of access points that has dynamic transmission power control and the RSSI heatmap information is configured to be used by the mobile platform along with measured RSSI values to determine a position fix.

DETAILED DESCRIPTION

Figure 1:
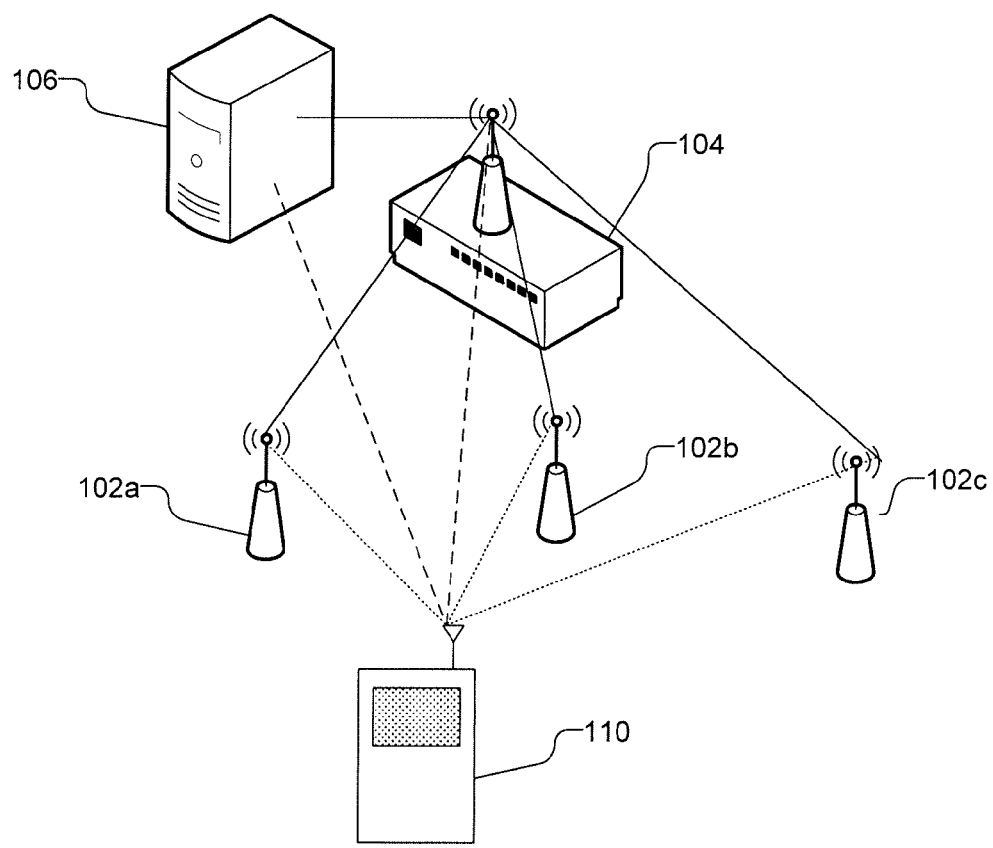
FIG. 1 illustrates a system in which a position fix for a mobile platform is determined using RSSI measurements from APs having dynamic transmission power control.

FIG. 1 illustrates a system 100 in which a position fix for a mobile platform 110 is determined using the received signal strength indication (RSSI) measurements from access points (APs) having dynamic transmission power control. The system 100 includes multiple wireless APs 102a, 102b, and 102c (collectively sometimes referred to as APs 102). At least one of the APs 102 has dynamic transmit power control, and for the ease of reference, in the present document, unless otherwise stated all of the APs 102 will be described as having dynamic transmit power control. Dynamic transmit power control is typically performed by a central entity that controls the plurality of APs. Dynamic transmit power control is sometimes performed by the APs 102 themselves, rather than a central entity, using distributed algorithms, and message exchanges, however, the transmission powers are still typically available at a central entity. Thus, as illustrated in FIG. 1, the APs 102 are connected to a central entity 104 (as illustrated with the solid lines), which determines the transmission power to be used by each of the APs, or receives the transmission powers from the APs when the dynamic transmit power control is performed by the APs 102. For the sake of brevity, central entity 104 will be described herein as a controller. The transmission power of the APs 102 may be varied based on several factors, such as interference or noise from nearby RF sources, the load on the APs 102, the distance from nearby APs, and/or the channel/Frequency band of nearby APs. The transmission power range used by the APs 102 may be large (e.g., 20 dB) with respect to the sensitivity of the RSSI measurements and the resulting position fix for the mobile platform 110. Dynamic transmission power control of APs is known in the art and the factors and processes used in the determination and control of the transmission power of the APs are beyond the scope of this disclosure.

As used herein, a mobile platform refers to a device such as a cellular or other wireless communication device, personal communication system (PCS) device, personal navigation device (PND), Personal Information Manager (PIM), Personal Digital Assistant (PDA), laptop or other suitable mobile device, such as a smart phone, laptop computer, tablet computer or any other device that is capable of receiving wireless communication and/or navigation signals to be used in determining a position fix. The term "mobile platform" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile platform" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile platform."

To perform positioning, the mobile platform 110 measures the RSSI values from each of the APs 102, as illustrated by the dotted lines between the mobile platform 110 and the APs 102, and compares the measured RSSI value for each AP 102 to an RSSI heatmap associated with the respective AP 102. The mobile platform 110 may communicate with a positioning assistance server 106, as illustrated with the dashed line between the mobile platform 110 and the positioning assistance server 106, for assistance in the navigation process, e.g., to obtain the RSSI heatmaps, as well as other navigation information, such as map data, presentation data, e.g., information to be presented during navigation, etc. . . . In general, determining a position fix and navigating using measured RSSI values and RSSI heatmaps is known in the art and beyond the scope of the disclosure.

In order to utilize an RSSI heatmap the transmission power of the AP must be known. The APs 102 shown in FIG. 1, however, have dynamic transmission power control, and thus, the transmission power of each of the APs 102 cannot be assumed to be any one value or known a priori. Moreover, communication between the mobile platform 110 and each of the APs 102 to determine the transmission power of each of the APs 102 is problematic. For example, querying each AP 102 every time a new measurement is made is inefficient and wasteful of energy and bandwidth. Additionally, querying each AP 102 periodically or having the APs periodically broadcast their transmission powers is problematic under existing 802.11 standards.

Thus, rather than obtaining the transmission power directly from the APs 102, the mobile platform 110 obtains the transmission power for each APs 102 from a separate source, e.g., from the central entity 104 or from the positioning assistance server 106, as illustrated by the dashed line between the mobile platform 110 and the central entity 104 or the dashed line between the mobile platform 110 and the positioning assistance server 106. The mobile platform 110 may have a data connection to the central entity 104, e.g., either over an IP interface or over an L2 interface, or any other appropriate connection, but should be configured to satisfy the security requirements of the central entity 104. The mobile platform 110 may query the central entity 104 for the transmission power of relevant APs 102 using, e.g., CLI (Command-Line Interface), SNMP (Simple Network Management Protocol), XML (Extensible Markup Language), etc. . . . .

By way of example, the mobile platform 110 may obtain the transmission power of relevant APs 102 by sharing an estimated position of the mobile platform 110 with the central entity 104, from which the central entity 104 may filter for relevant APs, i.e., APs within a designated radius from the estimated position, and provide information for only the relevant APs 102. Additionally, or alternatively, the mobile platform 110 may provide the central entity 104 with the Media Access Control (MAC) addresses (or other identifier) of APs 102 from which the mobile platform 110 can receive signals and the central entity 104 may provide the transmission power of APs based on the reported MAC addresses (or other identifier). Moreover, the mobile platform 110 may share measured RSSI values with the central entity 104, from which the central entity 104 may estimate the Location Context Identifier (LCI) of the mobile platform 110 and provide the transmission power for the APs 102 relevant to the LCI. As used herein, the term "location context identifier" relates to any information associated with a position that identifies one or more APs that may be used in navigation operations for a mobile station.

Alternatively or additionally, the mobile platform 110 may contact the positioning assistance server 106, for information related to the transmission power of the APs 102. As illustrated by the solid line between the positioning assistance server 106 and the central entity 104, the positioning assistance server 106 communicates with the central entity 104 to obtain necessary wireless transmission information, such as MAC address (or other identifier), location, and channel, as well as the current transmission power of associated APs 102. The positioning assistance server 106 may use its connection to the mobile platform 110 to provide RSSI heatmap information to the mobile platform 110. The RSSI heatmap information is based on the transmission power data for the APs 102 that the positioning assistance server 106 received from the central entity 104 and is configured to be used by the mobile platform 110, along with measured RSSI values, to determine a position fix. By way of example, the RSSI heatmap information that may be provided by the positioning assistance server 106 may be the transmission power data, in which case the positioning assistance server 106 may also provide an RSSI heatmap to the mobile platform. The RSSI heatmap information that may be provided by the positioning assistance server 106 may be an RSSI heatmap that incorporates the transmission power data. In other words, the RSSI heatmap that is provided to the mobile platform 110 is based on the transmission power data for the APs, and thus, the positioning assistance server 106 need not provide the transmission power data for the APs 102 to the mobile platform 110. The positioning assistance server 106 may periodically provide updated the RSSI heatmap information to the mobile platform 110, e.g., when new transmission power for the APs 102 is received from the central entity 104. The mobile platform 110 may obtain the RSSI heatmap information, e.g., the transmission power of relevant APs 102 or an RSSI heatmap that incorporates the transmission power, from the positioning assistance server 106, e.g., by sharing an estimated position of the mobile platform 110 with the positioning assistance server 106, from which the positioning assistance server 106 may filter for relevant APs, i.e., APs within a designated radius from the estimated position, and provide information for only the relevant APs 102. Additionally, or alternatively, the mobile platform 110 may provide positioning assistance server 106 with the MAC addresses (or other identifier) of APs 102 from which the mobile platform 110 can receive signals and the positioning assistance server 106 may provide the RSSI heatmap information based on the reported MAC addresses (or other identifier). Moreover, the mobile platform 110 may share measured RSSI values with the positioning assistance server 106, from which positioning assistance server 106 may estimate the Location Context Identifier (LCI) of the mobile platform 110 and provide the RSSI heatmap information for the APs 102 relevant to the LCI.

Figure 2:
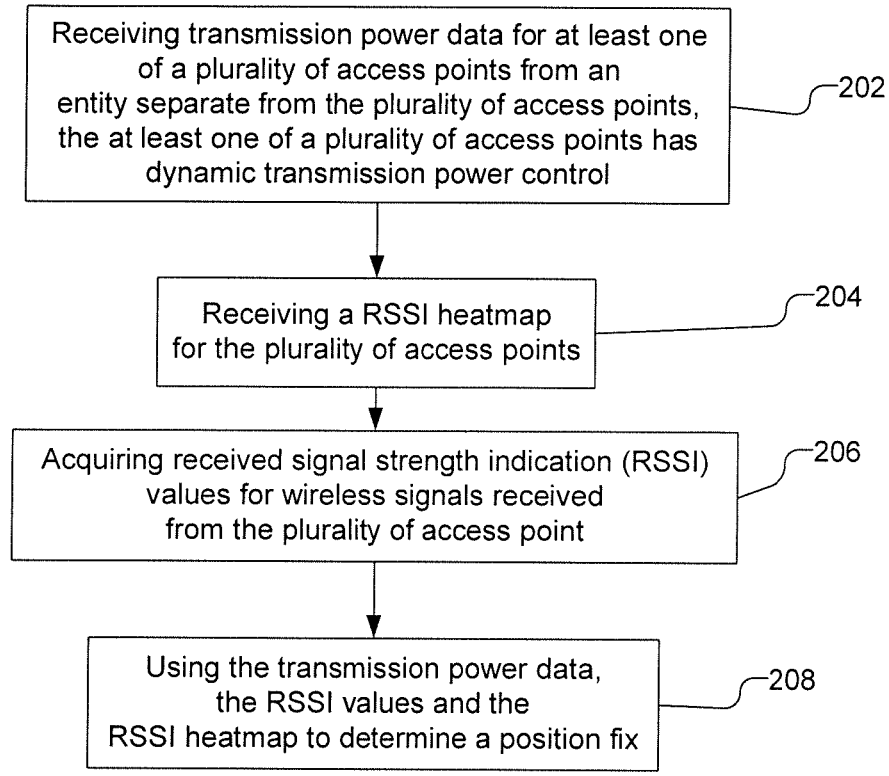
FIG. 2 is a flow chart illustrating a process of determining a position fix using multiple RSSI values from APs, at least one of which has dynamic transmission power control.

FIG. 2 is a flow chart illustrating a process of determining a position fix using multiple RSSI values from APs, at least one of which has dynamic transmission power control. As illustrated, transmission power data for at least one of a plurality of access points is received from an entity separate from the plurality of access points, where the at least one of the plurality of access points has dynamic transmission power control (202). For example, the entity separate from the plurality of access points may be the central entity 104 that provides the dynamic transmission power control for the APs 102 or the positioning assistance server 106 which itself receives the transmission power data for the APs 102 from the central entity 104 that provides the dynamic transmission power control for the at least one of the plurality of access points. In one implementation, the mobile platform 110 may generate an estimated position fix, e.g., using motion sensor based techniques, vision based techniques, or using any available and useable wireless signals, e.g., cellular and/or AP signals. The mobile platform 110 may transmit the estimated position fix to the entity before receiving the transmission power data for the at least one of the plurality of access points. The at least one of the plurality of access points for which transmission power data is received are within a predetermined radius of the estimated position fix. Alternatively, the mobile platform 110 may determine an identifier, e.g., MAC addresses, for the at least one of the plurality of access points and transmit the identifier for the at least one of the plurality of access points to the entity before receiving the transmission power data for the at least one of the plurality of access points, wherein the at least one of the plurality of access points for which transmission power data is received are associated with the identifiers. Alternatively, the mobile platform may transmit the RSSI values to the entity before receiving the transmission power data for the at least one of the plurality of access points, wherein the plurality of access points for which transmission power data is received are associated with a Location Context Identifier (LCI) determined by the entity from the RSSI values.

An RSSI heatmap for the plurality of access points is received (204), e.g., by mobile platform 110 from the positioning assistance server 106, or by the positioning assistance server 106 from a database. The RSSI heatmap is, e.g., a map of the path loss values for signals from the APs 102 based on the distance from the locations of the APs 102. The transmission power for the AP 102 from step 202 may be used with the pathloss values from the heatmap to produce strength values for the signals from the APs 102 based on the distance from the location of the APs 102. If desired, other types of RSSI heatmaps may be used, such as an RSSI heatmap that is based on signal strength values as a function of distance from an AP 102, where the signal strength values are based on a specific transmission power for each AP. In an implementation where the RSSI heatmap is based on signal strength values, however, different RSSI heatmaps would be used for different transmission powers of the APs, and thus, when the transmission power changes, a different RSSI heatmap would need to be used. Alternatively, a RSSI heatmap may include different signal strength values for each possible transmission power for each AP.

The RSSI values are acquired for wireless signals received from the plurality of access point (206). For example, where the mobile platform 110 is performing the method, the RSSI values may be measured by the mobile platform 110 from the wireless signals received from the APs 102. If the positioning assistance server 106 is performing the method, the RSSI values may be acquired by the positioning assistance server 106 from the mobile platform 110. The transmission power data for the at least one of the plurality of APs, the RSSI values and the RSSI heatmap are used to determine a position fix (208). The position fix may be determined by the mobile platform 110, or alternatively determined by the positioning assistance server 106, which may then transmit the position fix to the mobile platform 110. The position fix may be stored in memory and/or used for navigation.

Figure 3:
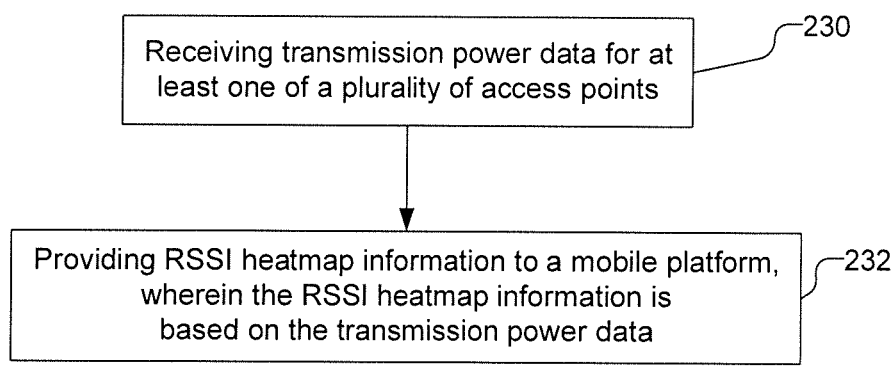
FIG. 3 is a flow chart illustrating a process of providing RSSI heatmap information to a mobile platform, e.g., by a positioning assistance server.

FIG. 3 is a flow chart illustrating a process of providing RSSI heatmap information to a mobile platform, e.g., by a positioning assistance server. As illustrated, transmission power data for at least one of a plurality of access points is received, wherein at least one of the plurality of access points has dynamic transmission power control from an entity separate from the plurality of access points (230). The entity that is separate from the plurality of access points may be, e.g., the central entity that provides the dynamic transmission power control for the at least one of the plurality of access points or the mobile platform, which receives the transmission power data from the central entity. The RSSI heatmap information is provided the mobile platform (232). The RSSI heatmap information is based on the transmission power data received for the at least one of the plurality of access points that has dynamic transmission power control and the RSSI heatmap information is configured to be used by the mobile platform along with measured RSSI values to determine a position fix. The RSSI heatmap information may be the transmission power data, where an RSSI heatmap may also be provided to the mobile platform. The RSSI heatmap information may be an RSSI heatmap that incorporates the transmission power data. Where updated transmission power data is received, updated RSSI heatmap information based on the updated transmission power data may be provided to the mobile platform. The RSSI heatmap information may be provided, e.g., based on a received estimated position fix for the mobile platform, where the at least one of the plurality of access points is within a predetermined radius of the estimated position fix. The RSSI heatmap information may be provided, e.g., based on a received identifier associated with the at least one of the plurality of access points. The RSSI heatmap information may be provided, e.g., based on received measured RSSI values, which is used to determine a Location Context Identifier, and the provided RSSI heatmap information is associated with the Location Context Identifier.

Figure 4:
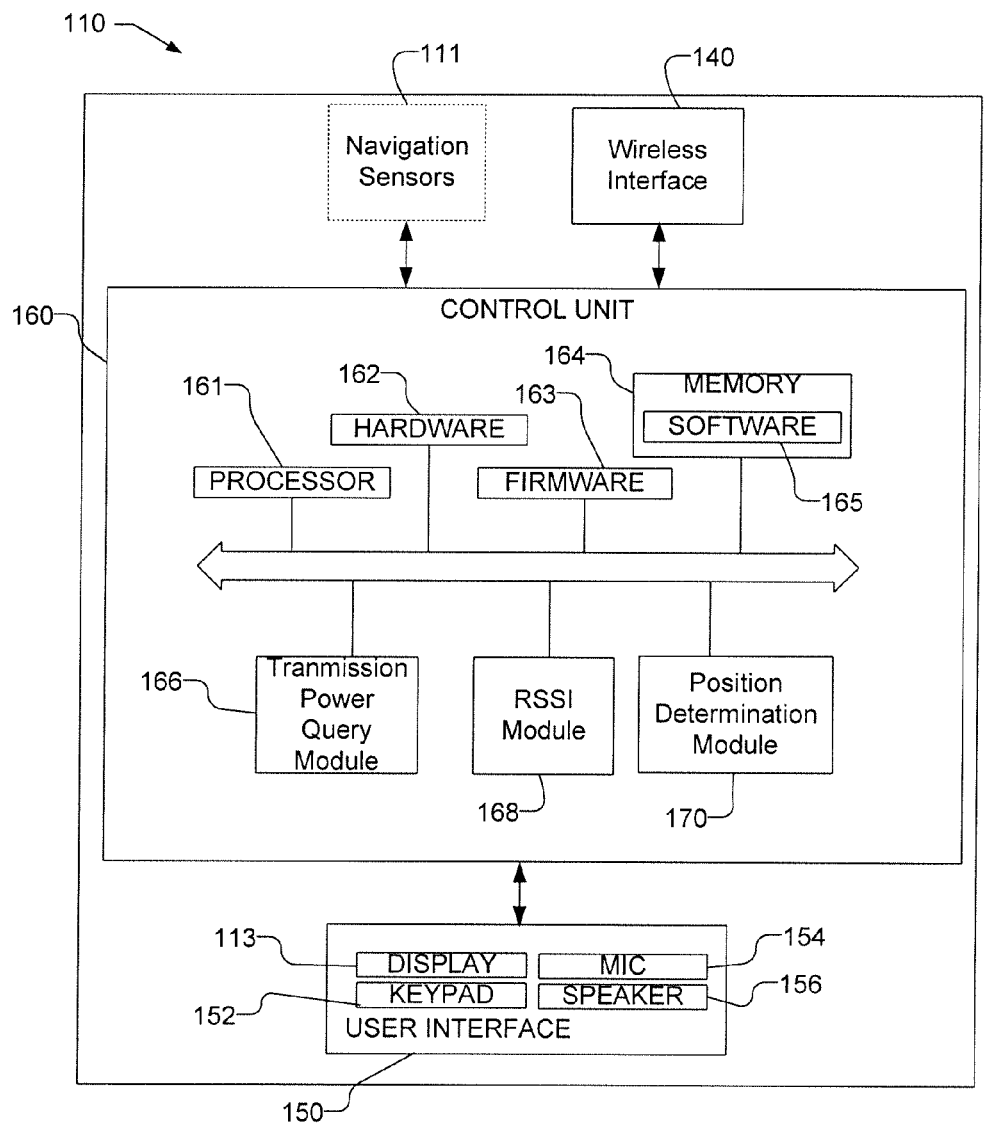
FIG. 4 is a block diagram of a mobile platform capable of determining a position fix using multiple RSSI values from dynamic transmission power control APs.

FIG. 4 is a block diagram of an apparatus, such as mobile platform 110, capable of determining a position fix using multiple RSSI values from dynamic transmission power control APs as discussed above. The mobile platform 110 includes a means for receiving wireless signals from the APs 102 as well wireless signals with the transmission power of the APs from an entity other than the APs 102, e.g., the central entity 104 and/or positioning assistance server 106, such as a wireless interface 140. The mobile platform 110 may optionally include navigation sensors 111, such motion or position sensors, e.g., accelerometers, gyroscopes, electronic compass, or other similar motion sensing elements, and/or a visual navigation sensor, e.g., a camera, which may be used to assist in the navigation process as is well understood by those skilled in the art. The mobile platform 110 may further includes a user interface 150 that includes a display 113, a keypad 152 or other input device through which the user can input information into the mobile platform 110. If desired, the keypad 152 may be obviated by integrating a virtual keypad into the display 113 with a touch sensor. The user interface 150 may also include a microphone 154 and speaker 156, e.g., if the mobile platform 110 is a mobile platform such as a cellular telephone. Of course, mobile platform 110 may include other elements unrelated to the present disclosure.

The mobile platform 110 also includes a control unit 160 that is connected to and communicates with an external interface, e.g., wireless interface 140. The control unit 160 may be provided by a processor 161 and associated memory 164, hardware 162, software 165, and firmware 163. The control unit 160 controls the wireless interface 140, e.g., a wireless transceiver, to receive wireless signals from APs 102. The control unit 160 further controls the wireless interface 140 to receive the RSSI heatmap from the positioning assistance server 106 and stores the RSSI heatmap in memory 164. As illustrated, the control unit 160 further includes a transmission power query module 166, that controls the wireless interface 140 to obtain the transmission power data of the APs 102 from an entity separate from the APs 102, e.g., from the central entity 104 and/or positioning assistance server 106 and stores the transmission power data in memory 164. The control unit 160 may further include an RSSI module 168 that measures RSSI values from the wireless signals from the APS 102 that are received by the wireless interface 140. The control unit 160 may further include a position determination module 170 to determine a position fix using the received transmission power, measured RSSI values and received RSSI heatmap.

The transmission power query module 166, RSSI module 168, and position determination module 170 are illustrated separately from processor 161 for clarity, but may be part of the processor 161 or implemented in the processor based on instructions in the software 165 which is run in the processor 161. It will be understood as used herein that the processor 161, as well as the transmission power query module 166, RSSI module 168, and position determination module 170 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

The mobile platform includes means for receiving transmission power data for a plurality of access points having dynamic transmission power control from an entity separate from the plurality of access points, which may be, e.g., the transmission power query module 166 and wireless interface 140. The mobile platform may further include means for acquiring RSSI values for wireless signals received from the plurality of access points, which may be, e.g., RSSI module 168. The mobile platform may further include means for receiving an RSSI heatmap for the plurality of access points, which may be e.g., the processor 161 controlling the wireless interface 140 to obtain the RSSI heatmap from the positioning assistance server 106. The mobile platform may further include means for using the transmission power data, the RSSI values and the RSSI heatmap to determine a position fix, which may be, e.g., the position determination module 170. Additionally, the mobile platform may further include means for generating an estimated position fix, which may be, e.g., the position determination module 170, e.g., using data from the navigation sensors 111 as well as previous position fixes, as well as means for transmitting the estimated position fix to the entity before receiving the transmission power data for the plurality of access points, which may be, e.g., the wireless interface 140. The mobile platform may further include means for determining identifiers for the plurality of access points, which may be, e.g., the processor 161 analyzing wireless signals received by the wireless interface 140, as well as means for transmitting the identifiers for the plurality of access points to the entity before receiving the transmission power data for the plurality of access points, which may be, e.g., the wireless interface 140. The mobile platform may further include means for transmitting the RSSI values to the entity before receiving the transmission power data for the plurality of access points, which may be, e.g., the wireless interface 140.

The methodologies described herein may be implemented by various means depending upon the application. For example, these methodologies may be implemented in hardware 162, firmware 163, software 165, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 164 and executed by the processor 161. Memory may be implemented within or external to the processor 161. If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Figure 5:
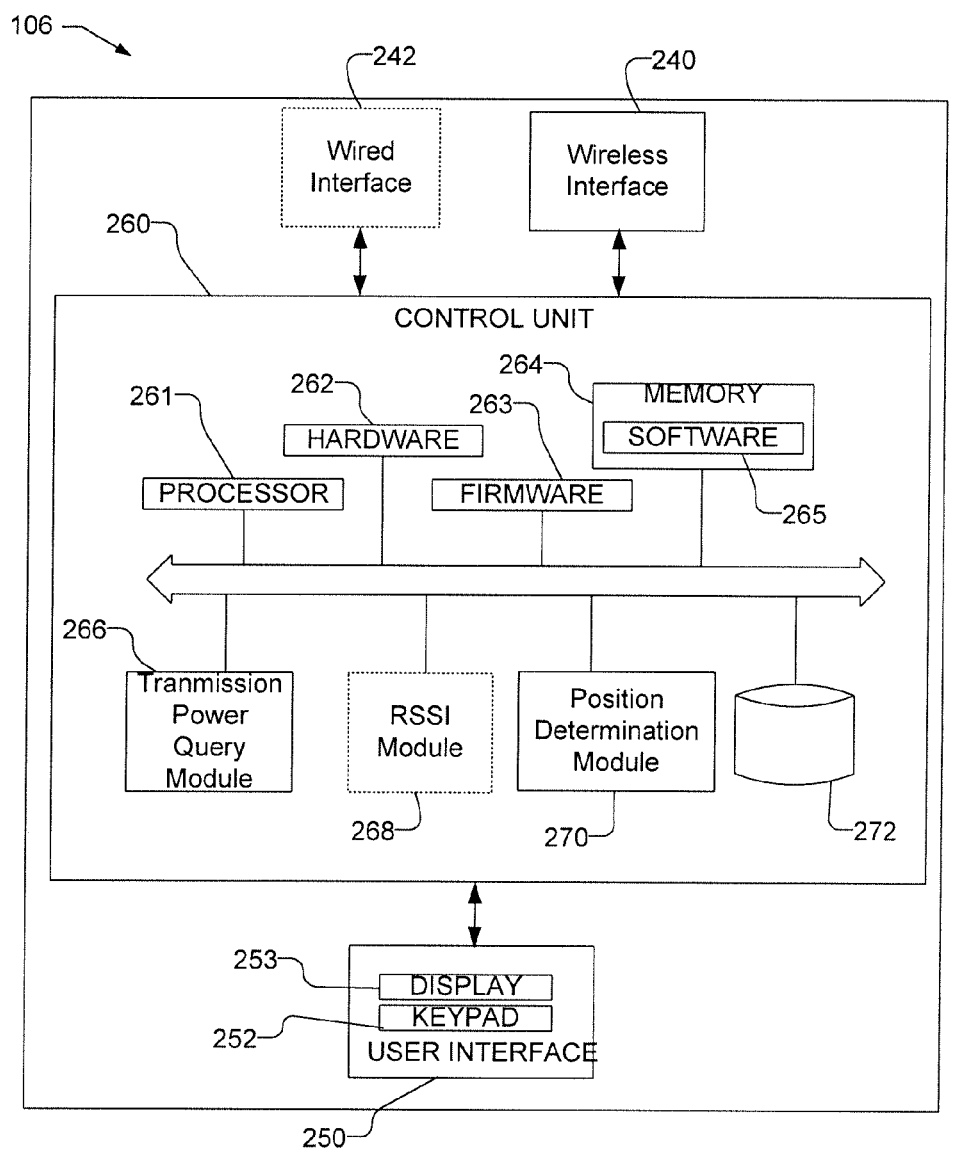
FIG. 5 is a block diagram of a positioning assistance server, which is capable of determining a position fix for a mobile platform using multiple RSSI values from dynamic transmission power control APs as discussed above.

FIG. 5 is a block diagram of an apparatus, such as positioning assistance server 106, which is capable of determining a position fix for a mobile platform 110 using multiple RSSI values from dynamic transmission power control APs as discussed above and/or providing RSSI heatmap information to the mobile platform 110 based on received transmission power data as discussed above. The positioning assistance server 106 may be similar to mobile platform 110 as described in FIG. 4 above. The positioning assistance server 106 includes a means for receiving wireless signals from the mobile platform 110, such as a wireless interface 240. The positioning assistance server 106 also includes a means for receiving signals with the transmission power of the APs 102, which may be the wireless interface 240 in communication with the central entity 104 or in communication with the mobile platform 110, where the mobile platform 110 received the transmission power from the central entity 104. Alternatively, the means for receiving the transmission power of the APs 102 may be an optional wired interface 242 that is in wired communication with the central entity 104. The positioning assistance server 106 may further includes a user interface 250 that includes a display 253, a keypad 252 or other input device through which the user can input information into the positioning assistance server 106. Of course, positioning assistance server 106 may include other elements unrelated to the present disclosure.

Similar to the mobile platform 110 discussed above, the positioning assistance server 106 also includes a control unit 260 that is connected to and communicates with the external interface, e.g., the wireless interface 240 and wired interface 242 if used. The control unit 260 may be provided by a processor 261 and associated memory 264, hardware 262, software 265, and firmware 263. The control unit 260 controls the wireless interface 240 to send and receive wireless signals with mobile platforms. The control unit 260 may further control the wireless interface 240 (or wired interface 242) to receive signals from the central entity 104. The control unit 260 includes a database 272, which stores, e.g., RSSI heatmaps, as well as positioning assistance information to be provided to the mobile platform 110. As illustrated, the control unit 260 further includes a transmission power query module 266, that controls the wireless interface 240 (or wired interface) to obtain the transmission power data of the APs 102 from an entity separate from the APs 102, e.g., directly from the central entity 104 or from the mobile platform 110, which obtained the transmission power data directly from the central entity 104. The transmission power data may be stored in memory 264. The control unit 260 may further include an RSSI module 268 that controls the wireless interface 240 to receive the measured RSSI values for APs 102 from the mobile platform 110, e.g., after the mobile platform 110 receives wireless signals from APs 102 and measures the RSSI values. The control unit 260 may further include a position determination module 270 to determine a position fix for the mobile platform 110 using the received transmission power, measured RSSI values and the RSSI heatmap received from the database 272. The control unit 260 may store the position fix, e.g., in memory 264 and/or cause the wireless interface 240 to transmit the position fix to the mobile platform 110.

The transmission power query module 266, RSSI module 268, and position determination module 270 are illustrated separately from processor 261 for clarity, but may be part of the processor 261 or implemented in the processor based on instructions in the software 265 which is run in the processor 261. It will be understood as used herein that the processor 261, as well as the transmission power query module 266, RSSI module 268, and position determination module 270 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

The positioning assistance server includes means for receiving transmission power data for a plurality of access points having dynamic transmission power control from an entity separate from the plurality of access points, which may be, e.g., the transmission power query module 266 and wireless interface 240 (or wired interface 242). The positioning assistance server may further include means for acquiring RSSI values for wireless signals received from the plurality of access points, which may be, e.g., RSSI module 268 and wireless interface 240 communicating with the mobile platform 110. The positioning assistance server may further include means for receiving an RSSI heatmap for the plurality of access points, which may be e.g., the processor 261 receiving the RSSI heatmap from the database 272. The positioning assistance server may further include means for using the transmission power data, the RSSI values and the RSSI heatmap to determine a position fix, which may be, e.g., the position determination module 270.

The positioning assistance server includes means for receiving transmission power data for at least one of a plurality of access points, wherein the at least one of the plurality of access points has dynamic transmission power control from an entity separate from the plurality of access points, which may be, e.g., the transmission power query module 266 and wireless interface 240 (or wired interface 242). The positioning assistance server may further include means for providing received signal strength indication (RSSI) heatmap information to a mobile platform, wherein the RSSI heatmap information is based on the transmission power data received for the at least one of the plurality of access points that has dynamic transmission power control and the RSSI heatmap information is configured to be used by the mobile platform along with measured RSSI values to determine a position fix, which may be the processor 261 receiving the RSSI heatmap from the database 272 and the wireless interface 240 when the RSSI heatmap data is an RSSI heatmap that incorporates the transmission power data, or the processor 261 and the wireless interface 240 when the RSSI heatmap information comprises the transmission power data. The positioning assistance server may further include means for receiving an estimated position fix from the mobile platform, which may be, e.g., the wireless interface 240, and means for determining that the at least one of the plurality of access points is within a predetermined radius of the estimated position fix before the RSSI heatmap information is provided to the mobile platform, which may be the processor 261. The positioning assistance server may further include means for receiving an identifier associated with the at least one of the plurality of access points, which may be, e.g., the wireless interface 240. The positioning assistance server may further include means for receiving the measured RSSI values, which may be, e.g., the wireless interface 240, and means for determining a Location Context Identifier based on the measured RSSI values before the RSSI heatmap information is provided to the mobile platform, which may be the processor 261. The positioning assistance server may further include means for receiving updated transmission power data for the at least one of the plurality of access points, which may be, e.g., the transmission power query module 266 and wireless interface 240 (or wired interface 242) and means for providing updated RSSI heatmap information to the mobile platform based on the updated transmission power data, which may be the processor 261 receiving the RSSI heatmap from the database 272 and the wireless interface 240 when the RSSI heatmap data is an RSSI heatmap that incorporates the transmission power data, or the processor 261 and the wireless interface 240 when the RSSI heatmap information comprises the transmission power data.

The methodologies described herein may be implemented by various means depending upon the application. For example, these methodologies may be implemented in hardware 262, firmware 263, software 265, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 264 and executed by the processor 261. Memory may be implemented within or external to the processor 261. If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising, at a mobile device:
   obtaining, at the mobile device, one or more transmission power parameters for at least one of a plurality of access points in a message exchanged with an entity separate from the plurality of access points and separate from the mobile device, wherein the at least one of the plurality of access points utilizes dynamic transmission power control;
   measuring signal strength values for wireless signals transmitted from the at least one of the plurality of access points;
   obtaining positioning assistance parameters referring to the at least one of the plurality of access points; and
   using the one or more transmission power parameters referring to the at least one of the plurality of access points, the measured signal strength values, and the positioning assistance parameters to estimate a position of the mobile device.

2. The method of claim 1, wherein the entity comprises a central entity to provide the dynamic transmission power control for the at least one of the plurality of access points.

3. The method of claim 1, wherein the entity comprises a positioning assistance server, and wherein the positioning assistance server obtains transmission power parameters of the at least one of the plurality of access points from a central entity to provide the dynamic transmission power control for the at least one of the plurality of access points.

4. The method of claim 1, further comprising:
   generating an estimated position; and
   transmitting the estimated position to the entity prior to obtaining the one or more transmission power parameters for the at least one of the plurality of access points, wherein the at least one of the plurality of access points for which transmission power parameters are obtained is located within a predetermined radius of the estimated position.

5. The method of claim 1, further comprising:
   determining an identifier of the at least one of the plurality of access points; and
   transmitting the identifier for the at least one of the plurality of access points to the entity prior to obtaining the one or more transmission power parameters for the at least one of the plurality of access points identified by the identifier.

6. The method of claim 5, wherein the identifier comprises a Media Access Control address.

7. The method of claim 1, further comprising:
   transmitting the positioning assistance parameters to the entity prior to obtaining the one or more transmission power parameters of the at least one of the plurality of access points;
   wherein the at least one of the plurality of access points for which transmission power parameters are obtained comprises a Location Context Identifier determined by the entity based, at least in part, on the measured signal strength values.

8. The method of claim 1, wherein the positioning assistance parameters comprise path loss values for the wireless signals from the plurality of access points based, at least in part, on distances from the plurality of access points.

9. A mobile device comprising:
   a wireless interface to transmit messages to and receive messages from a wireless communication network; and
   a processor coupled to the wireless interface of the mobile device, the processor to:
      obtain, from one or more first messages received at the wireless interface, one or more transmission power parameters for at least one of a plurality of access points, the one or more first messages to be exchanged with an entity separate from the plurality of access points and separate from the mobile device, the at least one of the plurality of access points utilizing dynamic transmission power control;
      obtain signal strength values for wireless signals transmitted from the plurality of access points and received at the wireless interface;
      obtain positioning assistance parameters from one or more second messages received at the wireless interface, the positioning assistance parameters referring to the at least one of the plurality of access points; and
      estimate a position of the mobile device based, at least in part, on the one or more transmission power parameters for the at least one of the plurality of access points, the obtained signal strength values, and the positioning assistance parameters.

10. The mobile device of claim 9, wherein the estimated position is additionally based, at least in part, on utilizing a motion-sensing technique, a vision-based technique or cellular wireless signals, or any combination thereof.

11. The mobile device of claim 9, wherein the entity separate from the plurality of access points comprises a positioning assistance server, wherein the positioning assistance server is further to obtain transmission power parameters for the at least one of the plurality of access points from a central entity, the central entity to provide the dynamic transmission power control for the at least one of the plurality of access points.

12. The mobile device of claim 9, wherein the mobile device obtains the one or more transmission power parameters for the at least one of the plurality of access points from a central entity, the central entity to provide the dynamic transmission power control for the at least one of the plurality of access points.

13. The mobile device of claim 9, wherein the processor is further configured to:
generate an estimated position; and
initiate transmission of the estimated position, through the wireless interface, to the entity prior to obtaining the one or more transmission power parameters for the at least one of the plurality of access points,
wherein the at least one of the plurality of access points for which transmission power parameters are obtained is located within a predetermined radius of the estimated position.

14. The mobile device of claim 9, wherein the processor is further configured to:
determine an identifier of the at least one of the plurality of access points; and
initiate transmission of the identifier, through the wireless interface, to the entity prior to obtaining the one or more transmission power parameters for the at least one of the plurality of access points identified by the identifier.

15. The mobile device of claim 14, wherein the identifier comprises a Media Access Control address.

16. A non-transitory computer-readable medium having stored thereon instructions executable by a processing unit of a mobile device to:
obtain, at the mobile device, one or more transmission power parameters for at least one of a plurality of access points in a message exchange with an entity separate from the at least one of the plurality of access points and separate from the mobile device, wherein the least one of the plurality of access points utilizes dynamic transmission power control;
obtain signal strength values for wireless signals obtained from the plurality of access points;
obtain positioning assistance parameters for the plurality of access points; and
utilize the one or more transmission power parameters for the at least one of the plurality of access points, the obtained signal strength values and the positioning assistance parameters to estimate a position of the mobile device.

17. The non-transitory computer-readable medium of claim 16, wherein the instructions are additionally to:
generate an estimated position; and
initiate transmission of the estimated position to the entity prior to obtaining the one or more transmission power parameters for the at least one of the plurality of access points;
wherein the at least one of the plurality of access points for which transmission power parameters are obtained is located within a predetermined radius of the estimated position.

18. The non-transitory computer-readable medium of claim 16, wherein the instructions are additionally to:
generate an estimated position utilizing a motion-sensing technique, a vision-based technique or cellular wireless signals, or any combination thereof.

19. The non-transitory computer-readable medium of claim 16, wherein the instructions are additionally to:
determine an identifier of the at least one of the plurality of access points; and
initiate transmission of the identifier for the at least one of the plurality of access points to the entity prior to obtaining the one or more transmission power parameters for the at least one of the plurality of access points identified by the identifier.

20. The non-transitory computer-readable medium of claim 16, wherein the instructions are additionally to:
initiate transmission of the signal strength values to the entity prior to obtaining the one or more transmission power parameters for the at least one of the plurality of access points;
wherein the at least one of the plurality of access points for which transmission power parameters are obtained corresponds to a Location Context Identifier determined by the entity from the signal strength values.

* * * * *